United States Patent [19]
Nehmer

[11] Patent Number: 5,233,251
[45] Date of Patent: Aug. 3, 1993

[54] ELECTRIC MOTOR WITH NON-RADIAL MAGNETIC DRIVE SYSTEM

[76] Inventor: Conrad C. Nehmer, 902 Front St., Sullivan, Wis. 53178

[21] Appl. No.: 800,958

[22] Filed: Dec. 2, 1991

[51] Int. Cl.[5] .................... H02K 7/075; H02K 17/06; H02K 27/10

[52] U.S. Cl. .................................... 310/167; 310/46; 310/79; 310/185; 310/261

[58] Field of Search ...................... 310/49 R, 68 B, 79, 310/84, 177, 180, 185, 261, 46, 167, 181, 199, 209

[56] References Cited

U.S. PATENT DOCUMENTS

| | | | |
|---|---|---|---|
| 788,291 | 4/1905 | Titzel, Sr. | 310/46 |
| 2,677,090 | 4/1954 | Fleming-Williams et al. | 318/443 |
| 2,725,512 | 11/1955 | Padron | 318/254 |
| 2,870,352 | 1/1959 | Williford | 310/162 |
| 3,118,138 | 1/1964 | Milas et al. | 340/319 |
| 3,121,812 | 2/1964 | MacArthur | 310/49 R |
| 3,470,509 | 9/1969 | Silverman et al. | 335/229 |
| 3,700,942 | 10/1972 | Alth | 310/164 |
| 4,873,463 | 10/1989 | Jones | 310/68 B |
| 5,070,264 | 12/1991 | Conrad | 310/68 B |

Primary Examiner—Steven L. Stephan
Assistant Examiner—D. R. Haszko
Attorney, Agent, or Firm—Andrus, Sceales, Starke & Sawall

[57] ABSTRACT

A D.C. motor includes a rotor and a stator with chordally oriented electromagnetic units, with windings pulse energized to establish a rotary force on the rotor as a result of the non-radial orientation of the driving forces. Each electromagnetic unit including a pole is extended along a substantially chordal line of the motor. All rotor poles are connected to a shaft by a radial crank arm and may be integrally or separately formed. A sensor detects pole alignment to then pulse the windings, and generate opposing magnetic forces to rotate the rotor. The winding establish opposite polarity at the adjacent pole ends of aligned poles to drive the rotor. A D.C. motor connected to the rotor, or special internal poles may be provided to align the poles for starting the motor. A plurality of the motors mounted to a common shaft with the electromagnetic units in the adjacent motors offset from each other and sequentially pulsed to establish continuous rotation. A multiple section motor assembly provides a stepping motor with small individual steps. Various rotor and stator constructions with crank-like rotor pole units are disclosed.

16 Claims, 6 Drawing Sheets

ELECTRIC MOTOR WITH NON-RADIAL MAGNETIC DRIVE SYSTEM

BACKGROUND OF THE PRESENT INVENTION

This invention relates to an electric motor having a pulsed drive system and particularly such a motor having a non-radial electromagnetic drive system.

Electric motors have been developed and used for a long period of time. All electric motors have been designed using a combination of a rotor with radial poles and a stator with radial poles and with windings wound in a plurality of slots, the stator windings are energized to create a rotating electromagnetic force interacting with the rotor to produce rotation of the rotor. Stepping motors have been similarly designed and provided with sequential energization of the windings to provide sequential alignment of the poles and with dynamic braking to hold the rotor poles in line with the stator pole. Ratchet type motors also provide for stepping action as well as a more or less continuous type of an energization of an electromagnetic coupled to a rotor through a ratchet drive mechanism. Ratchet drive motors are very special motors.

U.S. Pat. No. 4,873,463 discloses a D.C. motor with radial poles of fixed magnetic polarity and a rotating field stator with radial poles to provide rotor rotation in combination with seductive variation in the excitation of the stator to create like-magnetic poles at the gap to provide repelling force against the radial rotor poles. The system relies on the rotor field inducing an e.m.f. in the stator windings and the timing of pulsed energization of the stator windings. The stator and rotor cores are thus generally of a conventional construction with radial poles moving from and into alignment with special additional energization to create a repelling force.

SUMMARY OF THE PRESENT INVENTION

The present invention is particularly directed to new motor structures including a rotor mounted within a stator in which the rotor and stator are formed with non-radial driving electromagnetic units and in which the rotor and stator units are pulsed energized to establish a rotary force on the rotor as a result of the non-radial orientation of the driving forces. More particularly in accordance with the teaching of the present invention, the rotor is rotatably mounted and includes a plurality of electromagnetic units mounted in circumferentially spaced relation about the axis of rotation, with each unit including a core member mounted as an integrated part of the rotor with an electromagnetic force line offset from the axis of rotation and extended along a substantially chordal line to establish electromagnetic lever force applied to the rotor. A similar plurality of electromagnetics are mounted in the stator with a corresponding chordal line orientation such that as the rotor rotates, the electromagnetic units moved into successive alignment and create the force in the rotor. The windings or coils are preferably wound to concentrate the magnetic forces at the interface between the two magnetic poles to thereby maximize the force applied to the rotor. The relative orientation of the rotor and the stator is continuously monitored and the electromagnetic units are properly pulsed upon alignment to generate opposing forces whereby the rotor is driven as a result of the offset lever construction from the axis of the rotor.

The windings of the rotor and the stator can be selectively oppositely energized to lock the motor in position, or to create an initial alignment in the starting of the motor. The several windings or coils of the rotor and the stator are preferably individually connected to the power supply such that the coils drive function and effect can be individually controlled to thereby control the output characteristic of the motor.

More particularly in a practical construction, the elements are equicircumferentially oriented with one or more pick-up units monitoring the continuous angular orientation between the rotor and the stator unit to provide for the synchronized pulsed energization of the electromagnetic units. Each of the electromagnetic units will be mounted with a special core member and with a winding about the core member. The rotor cores include a radial arm portion projecting from the shaft and offset and a non-radial arm projecting from the radial arm to form a crank-like configuration in the rotor. The windings are connected to a suitable high energy pulse source for establishing like poles at the interface between the rotor and the stator such that the core members create opposing or separating magnetic forces thereby creating a drive pulse on the rotor core and creating rotation through the offset lever arm configuration of the poles.

If poles are not aligned, some means for initiating rotation is required. This can be established by a small coupled conventional drive unit or internal poles similar to those used in conventional motor constructions. For example, if auxiliary poles, or a large member of driving poles, are mounted in the unit, the conventional initiating drive might be provided whereby the windings are oppositely energized to create a magnetic attractive force tending to draw closely adjacent electromagnetics into alignment. Further, a motor may include a plurality of separate motor units with electromagnetic units radially offset whereby at least one motor unit is available to start the motor.

Thus, in a particular construction, a plurality of motor units are mounted to a common shaft with the electromagnetic units in the adjacent units offset from each other. The various motor assemblies are pulsed at different times such that the pulsing of the one motor will drive at least one other unit into alignment and provide pulsing of such other unit. By employing a substantial plurality of such drive units mounted to a common output, a motor operating with either steps of any desired degree, or at a high speed and continuous rotation, can be established.

The plurality of motor units coupled to a common output shaft allows operation of the motor with a continuous applied output torque as well as operation with a stepping output with the step length essentially infinitely adjustable. Further, with individual power connections to the several coils, the coils can be energized to provide either the repelling drive forces or an attracting drive force for forward rotation of the motor, or with selected coils providing a selected reverse rotational force, and thereby establish a high degree of control of a load device. For example, robotic devices often require slow and highly accurate placement. Further, the present invention allows dynamic holding of loads in place.

The rotor structure can be provided with suitable commutating devices for providing sequential power to the rotor electromagnetics, such as by a conventional brush unit mounted to the one end of the motor, with the windings interconnected through end mounted sliding contacts.

In a multiple motor assembly, reversal of the direction of rotation can be readily created having alternate motor assemblies oriented with the electromagnetic drive units essentially perpendicular to each other. The one set of electromagnetic drive units would provide for forward rotation while the energization of the opposite set of electromagnetics drive units would provide for reverse rotation.

In accordance with another aspect of this invention, each of the interacting drive coil units is preferably coupled to the power source for individual energization. This permits the selection of all of the units or less than all of the units depending upon the load requirements on the motor, and contributes to the efficient operation of the motor, and with appropriate oppositely oriented electromagnetically energized crank elements provides for clockwise or counter-clockwise rotation of the motor.

In a practical construction, a main shaft is provided with a center hub structure defining the angularly offset force applicating elements. The hub is accurately formed to receive an inner wheel with the prewound electromagnetics to form a rotor. The rotor is formed with an outermost ring-shaped rim spaced from the hub. The electromagnetic units, consisting of a magnetic core and appropriate windings, are located between the rim and the hub, with the magnetic cores abutting and providing a direct interconnection or coupling between the magnetic members and the hub. The magnetic cores project through the openings in the rim and terminate in curved ends of the same radius as the rim. The cavity of spaces between the units and between the outer ring and the hub is preferably filled with a suitable filler such as a plastic material which will interact to securely bind the components to each other to form a strong rotor structure. Electrical contact plates can be secured to the face of the rotor, and coupled to fixed sliding brushes, for either individual coils or for successive energization of sequential aligned coils, for connection into circuit through the outer contact brush connector unit secured to the stator end bearing plates. Sliding contacts also may be mounted on the shaft and provide for electrical interconnection to contact brushes secured to the outer fixed housing.

End bearing plates may be provided with centered bearing hubs and provide a support for the electric rotor. The end plates may be extended out and interconnected to the stator to complete the motor. The stator may be a fixed unit secured to the end plates and supported thereby. The outer stator is an annular member having an inner diameter slightly greater than the outer diameter of the rotor wheel with the circumferentially spaced electromagnets units having cores precisely oriented for in-line alignment with the rotor cores. The electromagnetic units of the stator may be supported in a pair of spaced annular rings with a suitable plastic or other filler to firmly support the electromagnetics, or alternately may be separate units bolted or otherwise secured to a mounting ring spaced slightly from the rotor. To provide appropriate timing, a suitable sensor such as a reluctance is secured to the outer surface of the stator housing. Although any suitable sensor may be used, the reluctance sensor or the like is preferred over various photocell units because of a more rapid response time and accuracy overall. The sensor responds to one or more precise locating marks or elements on the rotor housing. Alignment of the reluctance sensor with a mark generates a signal for energizing of the aligned electromagnetic units. The sensor is preferably and adjustably mounted to permit manual or precise adjustment and setting for creation of the signals with the alignment of the electromagnetic units.

The present invention thus provides a new and unique electric motor construction which can provide precise movement in either a continuous rotational mode or as stepping motor in which the steps are essentially infinitely adjustable. The motor can be a reversal motor, with the torque conveniently adjusted to the desired level in both operating modes.

BRIEF DESCRIPTION OF THE DRAWINGS

The drawings furnished herewith illustrate a preferred construction of the present invention in which the above advantages and features are fully explained hereinafter.

In the drawings.

DESCRIPTION OF THE ILLUSTRATED EMBODIMENT

Figure 1:
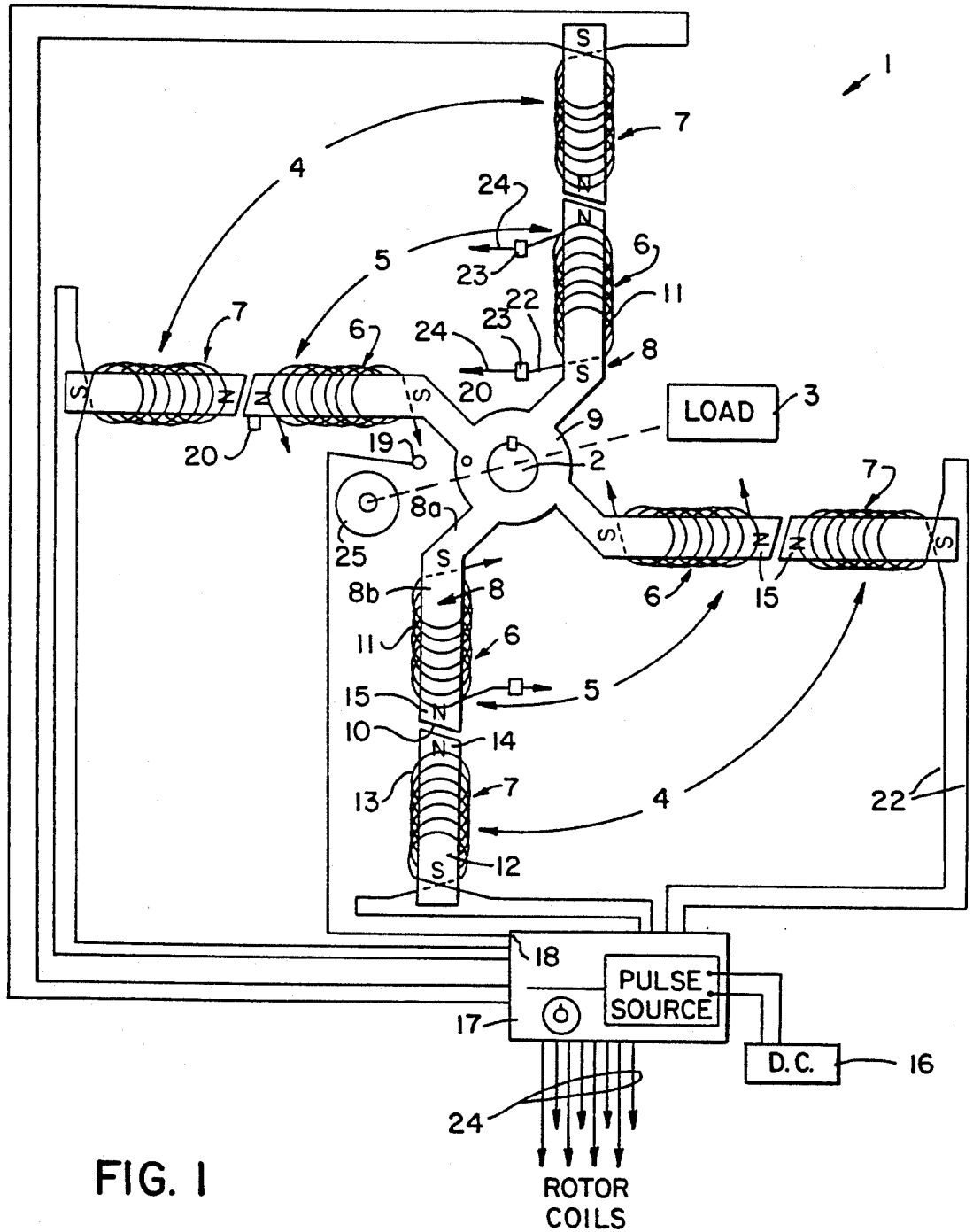
FIG. 1 is a schematic illustration of one motor embodiment construction in accordance with the teaching of the present invention to illustrate the detail of the motor elements in accordance with the teaching of the present invention.

Referring to the drawings and particularly to FIG. 1, an electric motor 1 constructed in accordance with the teaching of the present invention is diagrammatically illustrated having an output shaft 2 adapted to be connected to any suitable load 3. The motor 1 is shown including an outer annular stator 4. A cylindrical rotor 5 is rotatably mounted within the annular stator, with the motor shaft 2 supported to the opposite ends of the rotor in suitable bearings, not shown.

The rotor includes a cylindrical body with a plurality of circumferentially distributed electromagnetic units 6. The stator 4 is also formed with a plurality of circumferentially distributed electromagnetic units 7. The units 6 and 7 are specially constructed in accordance with the present invention, and one embodiment is shown in FIG. 1.

More particularly, the rotor 5 is formed with the plurality of circumferentially distributed electromagnetic units 6. Each unit 6 includes a special magnetic core 8 interconnected to an inner hub 9 which is keyed or otherwise fixed to the rotating shaft 2. The core 8 is illustrated including a linear crank member 8a which extends radially from the hub 9 for a short distance and a linear core portion or member 8b which extends in a chordal plane through the cylindrical rotor, with the outer end of core 8b terminating in the outer surface of the rotor 5. The outer or end face 10 of core 8b conforms to the curvature of the rotor to maintain the same spacing relative to the stator 4. A suitable winding or coil 11 is wound about core 8b and, when energized, magnetizes the core 8 and particularly linear core member 8b to establish a magnetic pole at the outer end. The hub 9 and core 8 are integrally formed and define crank members secured to the shaft 2.

The stator 4 includes the plurality of electromagnetic units 7. Each unit 7 includes a linear core 12 which is mounted at the same angle with respect to the shaft axis as the core members 8b of the rotor's electromagnetic units 6. Each unit 7 also includes a suitable winding or coil 13 to create a magnetic pole at the inner face of the stator 4. The inner end face 14 of each core 12 has the same curvature as the rotor cores 8b to form a small air gap therebetween. As the rotor 5 rotates, the cores 8b and 12 are aligned with each other, as shown in FIG. 1. By appropriate energization of the electromagnetic units 6 and 7, the aligned ends 10 and 14 of the cores are magnetized to have the same polarity, shown as all north poles 15 and thereby creating a separating force. The cores 8 are crank-like members and the reaction force of the like poles 15 drive the rotor 5 and shaft 2 about its axis. In operation, the electromagnetic units 6 and 7 are pulsed each time cores 8b and 12 are in alignment to generate a continuous rotating force.

The electromagnetic units 6 and 7 are connected to a suitable D.C. power supply 16 through a suitable control unit 17 having a control input 18. A rotor sensor unit 19 has an output connected to input 18. The sensor unit 19 is mounted to the stator 4 and coupled to the rotor 5 to detect the angular position of an element 20 on the rotor and thereby the relative positions of the rotor and stator, and provide for a controlled pulsing of the electromagnetic units 6 and 7. Although any suitable sensor may be used, a magnetic or reluctance sensor is preferred because of the response time and resulting accuracy of the timing control.

The present invention thus operates the motor based on the opposing magnetic forces created by the crank members 8 through appropriate energization of the aligned rotor and stator electromagnetic units 6 and 7.

The electromagnetic units 6 and 7 are preferably individually connected to power by the control unit 17, as shown, for selective individual energization. This provides for and is particularly desirable in units having a substantially greater number of poles, or a motor unit having a plurality of offset rotor and stator sections, as more fully described and discussed in the embodiments of FIGS. 2-7 inclusive. With the individual energization of the coils, the coils can be provided with an opposite energization to effectively pull the coil into alignment if the other means do not provide such alignment, such as inertia.

More particularly, as schematically illustrated in FIG. 1, each of the windings 13 of electromagnetic unit 7 have the ends of the ends of the windings connected by individual leads 22 to corresponding output terminals of the control unit 17. Similarly, the ends of the rotor windings or coils 11 are connected by suitable sliding contact units 23 to power leads 24 which are individually connected to output terminals on the control unit 17. Although the control unit could provide for simple manually actuated switches for presetting of the rotor energization to provide a particular predetermined characteristic of operation, the system would preferably be provided with an automated control having suitable input for selective energization of the coils, including variations in the polarity and the level of energization. These facets of the present invention are more fully discussed in connection with the more detailed diagrammatic illustrations of various motor embodiments in FIGS. 2-7 and are shown in FIG. 1 for simplicity of illustration.

With modern day microprocessor technology, the total system could be readily adapted to a logic control system to provide the selective energization of the windings to accomplish different results with appropriate inputs. Such input could be established directly through manual programming input or through any type of an automated monitoring system. For example, in positioning of a load, the load position may be accurately monitored and the energization of the motor windings varied either by varying the number of the units activated or the level of energization to vary the movement of the load. When the load has reached a selected position, dynamic braking could be employed to hold the load in the desired location by opposite energization of the windings with the coil units aligned. For accurate positioning, a substantially greater number of effective pole units would be desirable as discussed hereinafter.

Depending upon the motor construction, the cores 8 and 12 may be so misaligned at starting that an auxiliary unit may be required to align the units 6 and 7. A simple device is to provide a manual or power driven cranking device. For purposes of illustration, a small D.C. permanent magnet motor 25 is shown coupled to the power supply 16 through the control unit 17 and provides a cranking device to initiate rotation of the motor and thereby establish the necessary core alignment. By suitable selection of the motor 25, the running state of the motor 1 can drive the start motor 25 as a generator and feedback power to the D.C. supply.

Figure 2:
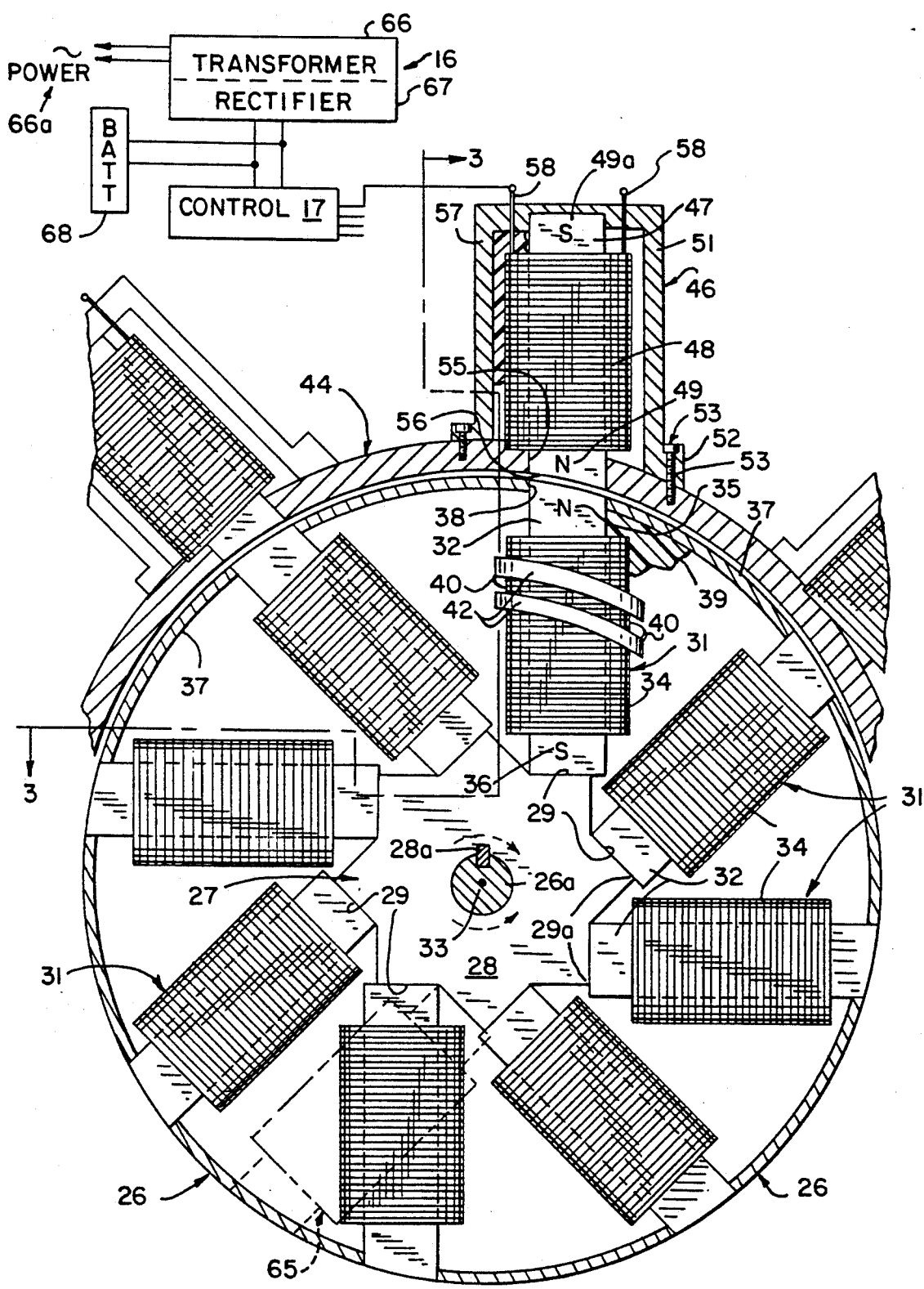
FIG. 2 is a vertical sectional view of a rotor structure and a portion of a stator structure illustrating one construction of a motor.
Figure 3:
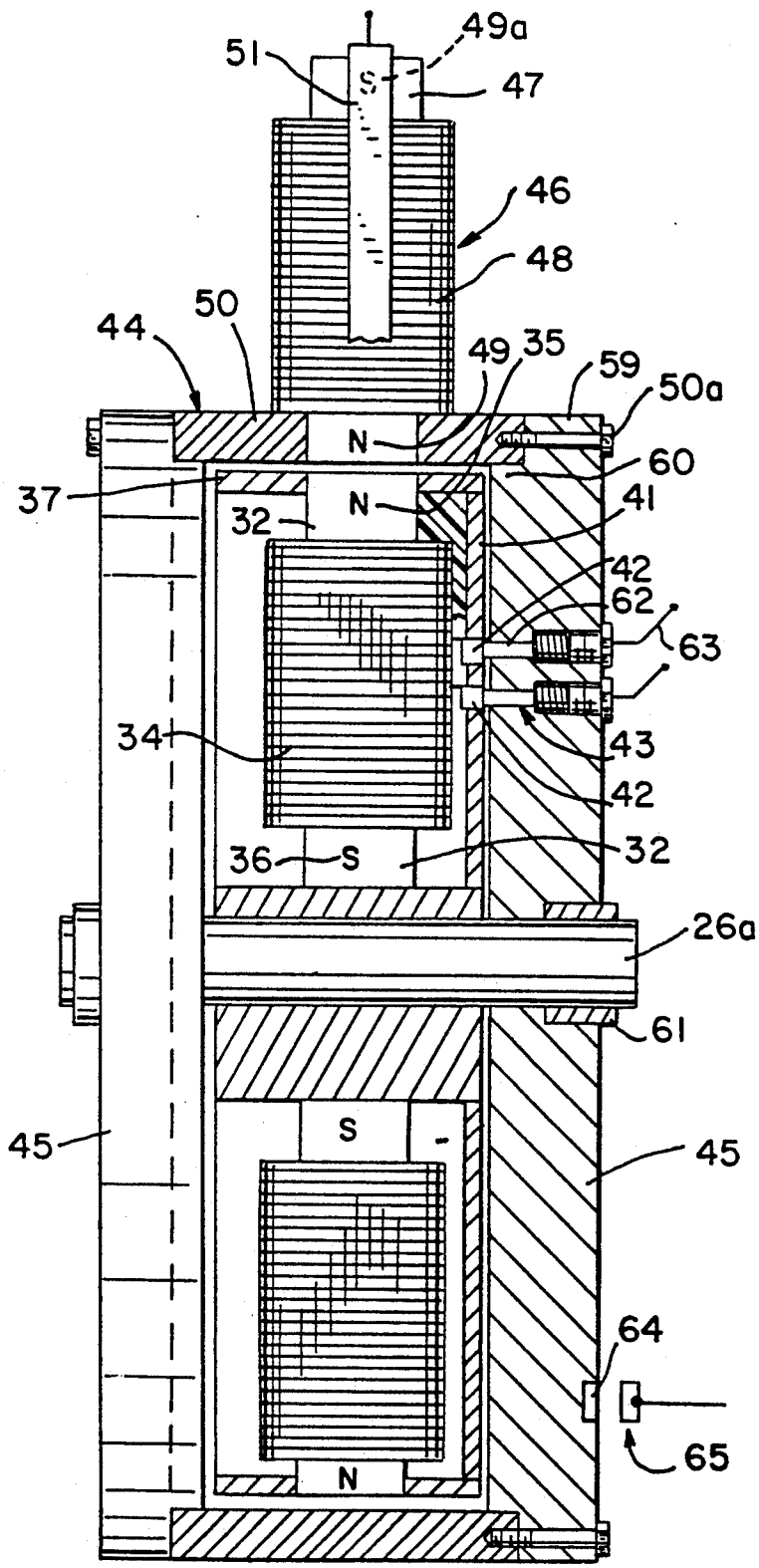
FIG. 3 is a side elevational view of the rotor shown in FIGS. 2 and 3 with parts broken away and sectioned.
Figure 4:
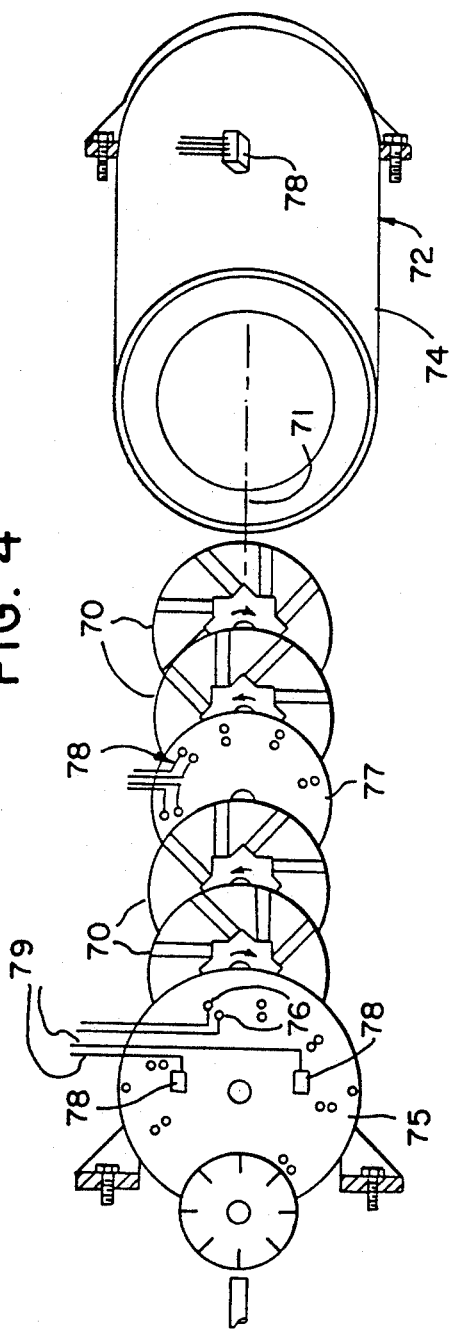
FIG. 4 is an exploded pictorial view of a plurality of rotor units mounted on a common shaft for mounting an elongated stator and constructed in accordance with the present invention.

The basic motor unit, as schematically illustrated in FIG. 1, may be constructed as shown in FIGS. 2-4 which is described more particularly as follows.

Referring particularly to FIG. 2, a rotor unit 26 is mounted on a suitable shaft 26a. A rotor core unit 27 is mounted on the shaft 26a, and in the illustrated embodiment of the invention, includes a separate machined hub 28 affixed to the shaft 26a through a suitable keyed connection 28a. The hub 28 is formed with a plurality of equicircumferentially distributed core couple portions shown as flat chordal surfaces 29 all spaced equi-distanced from the axis of the shaft 26a.

For purposes of illustration, an octagonal cross section is illustrated defining eight equicircumferentially spaced triangular portions with perpendicularly related chordal surfaces 29. In particular, the configuration is formed by a pair of square configuration cross sections offset by ninety degrees to define the eight apexes 29a, each of which is defined by perpendicular surfaces 29. Eight electromagnetic units 31 are mounted within the rotor structure. Each of the electromagnetic units 31 is similarly constructed with a linear central core 32 extending from the same planar surface 29 of each apex 29a, and extending outwardly in alignment with the plane of second and adjacent perpendicular surface 29. This locates the magnetic force line of the core 32 laterally spaced from the axis 33 of shaft 26a to form a crank arrangement, as in FIG. 1, for rotating the interconnected hub 28 and shaft 26a. A high turn coil or winding 34 is wound about the magnetic core 32 and is operable to establish a magnetic flux field concentrated within the magnetic core. The winding 34 is connected to a D.C. source through a control unit, such as shown in FIG. 1 and thus establishes a magnetic field within core 32 having opposite poles 35 and 36 at the opposite ends of the winding and the core. For purposes of discussion, it is assumed that the winding is energized to establish a north pole 35 at the outer surface of the rotor and a south pole 36 at the inner end of the same core. The winding 34 is preferably a multiple turn winding and is adapted to establish a flux force sufficient to provide the necessary turning power on the rotor unit.

The electromagnetic units 31 are supported in any suitable manner to form the rotating rotor structure. In a practical construction as shown in FIG. 2, the hub structure 27 is formed as a separate element. The cores 32 are formed as linear elements with the windings 34 wound thereon. An outer encircling rotor housing rim 37 is provided of a diameter defining an outer cylindrical wall of the rotor 26. The outer ring 37 has circumferentially spaced openings 38 to receive the outer ends of the linear cores 32. The outer end of each core 32 is curved with a radius conforming to the curvature of the outer housing ring 37. After assembly with all electromagnetic units 28 in place, the electromagnetic units may be secured to each other, to the hub 24 and to the outer housing ring 37 by casting of a suitable plastic or other material 39 into the interface therebetween, as partially shown in FIG. 2.

The electrical leads 40 (FIG. 3) for each of the coils 34 extend radially outwardly and terminate in an end face member 41 of a suitable insulating material and more particularly in slip rings 42. Member 41 is shown as a suitable non-conductive plate secured to the ring or rim 37 and the hub 25. Member 41 is removed in FIG. 2. The terminated leads 40 for the coils 34 are connected to individualized slip rings 42 secured to plate member 41. The slip rings 42 for each coil are similarly radially spaced, and connected to circumferentially spaced sliding contacts such as brush units 43 connected to the output of the power supply or source 17. Brush units 43 are provided equal in number to the coils 34 and separately connected to source 33 to permit individual selection of the coils 34 to be energized and the polarization thereof. As more fully described hereinafter, the rotor is thus formed as a cylindrical member of an axial thickness at least as thick as the axial thickness dimension of each of the electromagnetic units, and preferably somewhat greater, to provide smooth end surfaces to the opposite end and complete enclosure or encapsulation of the windings.

The rotor is rotatably mounted within an annular stator 44 and particularly end bearing plates 45. In the illustrated embodiment of the invention, each rotor electromagnetic unit is shown in the starting alignment with an electromagnetic unit 46 of the stator 44.

Thus, the stator unit 44 includes a like plurality of electromagnetic units 46, each of which includes a linear core 47 oriented on the same chordal line orientation as the cores 32 of the rotor. A separate winding 48 is again wound on each stator core 47 and separately connected to the D.C. supply for individualized energization to establish an electromagnetic field. Generally, the stator windings 48 create a directional magnetic field with a polarity the same as that of the electromagnetic unit 31 of the rotor. In the illustrated embodiment of the invention, the inner end of each core adjacent to the rotor surface is shown with a north pole 49 and the outer end with a south pole 49a. With the electromagnetic unit 31 and 46 aligned, and particularly with the cores aligned, simultaneous energization of the coils 34 and 48 of aligned electromagnetic units 31 and 46 creates the opposing magnetic forces.

The stator 44 is fixedly mounted and consequently the force will be transmitted to the shaft 26a, directly through the crank arm construction created by the hub 28, resulting in rotation of the rotor. The electromagnetic units 31 and 46 may be sequentially simultaneously aligned through the initial effect of the rotor and energized on each alignment to effect the desired and initial rotation.

The stator unit of FIG. 2 is shown including a cylindrical housing 50 to which the end bearing plates 45 are secured as by screws 50a and the electromagnetic units 46 are mounted on the exterior of the house.

The electromagnetic units 46 each include an outer U-shaped frame 51 with mounting flanges 52 bolted to housing 50 as at 53. The illustrated electromagnetic units 46 are generally similar to the rotor units, and each includes the linear core 47 with a suitable multiple turn winding 48. The inner end of the core 47 projects through an opening 55 in the housing 50 of the stator and terminates in the plane of the inner diameter thereof. The inner core end is curved as at 56 to conform to the circular configuration of the housing which is located in close spaced relation to the outer surface of the rotor ring 37 to create a minimal air gap. With the electromagnetic units 31 and 46 precisely aligned, the cores 32 and 47 are thereby closely spaced to each other to provide maximum coupling therebetween. The core 47 and winding 48 are secured within the frame 51 which may be filled within a suitable support material such as an epoxy plastic 57 which will firmly bond and join the components of each electromagnetic unit 46 to each other to provide a strong self-supporting unit.

The stator winding leads 58 are shown terminating in the outer end of the stator frame 51. The leads 58 are connected at the D.C. power supply through the control unit for simultaneous energization of the rotor and the stator electromagnetic units 31 and 46 in synchronism with alignment of the respective core units.

In the illustrated embodiment of the invention, opposite end bearing plates 45 are secured to the stator housing 50. The end plates 45 are similarly formed as rotor members having an outer flange 59 abutting the stator housing 50 and a projecting rim 60 which projects into the end of the stator housing 50. The bearing plates 15 are secured to the stator housing 50 by screws 50a, with a bearing unit 61 in precise alignment to receive the shaft 26a of the rotor and establish rotatable support of the rotor. The bearing plates may be formed of a suitable metal, plastic or other material having the necessary strength.

The bearing plate 45 adjacent the sliding contacts 42 of rotor winding 34 is provided with a plurality of the electrical brush-type contacts unit 43 each of which is connected to the power supply. The brush units 43 are shown mounted in suitable openings in the end bearing plate, and each includes a spring loaded contact 62. The outer end of contact 62 is connected to a power lead 63 from the control unit for proper energization of each unit 31 of the rotor. The stator winding leads 63 again are shown terminating in the outer end face of the stator. The leads are connected directly to the D.C. power supply through the control unit for simultaneous energization of the rotor and the stator electromagnetic units 31 and 46 in synchronism with alignment of the respective core units.

The timing system includes a sensor unit 62 which may be of any suitable type such as a photocell unit, a Hall cell sensor, a magnetic or reluctance sensor or other device which preferably provides a rapid response to the alignment. The sensor unit 62 includes a position sensor 63 mounted to the stator housing 50 and particularly the end plate 45. A position element 64 is secured to the face plate member 41 of the rotor. When the sensor 63 is aligned with element 64, a control signal is created at the control unit 31 such as shown in FIG. 1 for controlled energizing of electromagnetic units 31 and 46.

The motor structure as described may be constructed to permit reverse rotation of the rotor. Referring to FIG. 2, the hub structure includes the two perpendicularly related surfaces 39 to each side of the apex 29a. By rotating the relative position of alternate electromagnetic units 31 to the second planar surface 29, a reverse rotational drive can be established. A single one of the electromagnetic units 31 is shown in phantom rotated to an alternate position, as at 65. Alternate stator units 46 would be appropriately oriented to provide for appropriate alignment of the shifted or rotated units 31 for a reverse rotational drive.

The control unit may consist of any suitable system for pulsed energization of the unit 28 and 46, and may for example, include a suitable oscillator circuit for generating a pulse signal upon each demand created by sensor 63. The output can provide the necessary power to the units 31 and 46 and particularly the windings to rapidly produce the necessary magnetic field in the cores to create strong opposing magnetic forces for rotating of the rotor. The control unit 34 may for example provide a current control to control the energization of the electromagnetic units 31 and 46. Control of only one unit 31 may provide a method of controlling the total torque applied and the output torque of the motor. Further, only selected aligned electromagnetic units of the rotor and the stator may be energized to further provide variation in the output torque, and or speed of rotor rotation. The control unit may also include a manual or programmable system for advancing and retarding the energization of the electromagnetic units such that the rotational characteristic of the rotor can be adjusted to a particular work load.

Thus, suitable logic control or a computer based system can readily be provided for controlling the pulsing of the windings including the pulsing sequence and the current energization to vary the force created within the motor. With the improved control, both the pulsing rate and the power level unit can provide a suitable direct drive by appropriately developing the motor with the necessary motor sections and the like. The motor is also particularly adapted to a variable load application through the use of selective energization of different numbers of the coil units in a given motor.

In a stepping motor application, the unit can be energized to rotate the rotor 26 in precise steps. With the electromagnetic units, dynamic braking can be created by providing a reverse signal to electromagnetic units to positively stop and hold the rotor in each position. The holding force can of course be controlled by the energization level of the electromagnetics units. Thus, for example, as applied to a conveyor load, the output can be driven at any desired speed and with a variable speed.

The D.C. supply 16 of power supply 17 may be any suitable construction and is shown in FIG. 2 including an alternating current transformer 66 having an input connected to a conventional power distribution system 66a. A suitable full wave rectifier 67 is connected to secondary side of the transformer 66 to supply the necessary D.C. current and voltage to the output. The supply is shown including a battery unit 68 connected to the output of rectifier 67 for charging of the battery unit 68. Where the motor starting system uses a D.C. permanent magnet motor or the like, the motor is maintained coupled to the main motor 1. Excess energy developed in motor 1 may also be used to charge the battery unit 68 to recover such energy. The battery may thus supply energy for operating of the motor 22 to start the motor.

The embodiments of the invention shown in FIGS. 1-3 clearly illustrate the basic element of the invention including the crank-like structure of the rotating component and the cooperating magnetic driving forces which are created in proper timed relation to the alignment of the magnetic cores. Variation of such structure can readily be provided based on such basic approach in the new motor.

Figure 5:
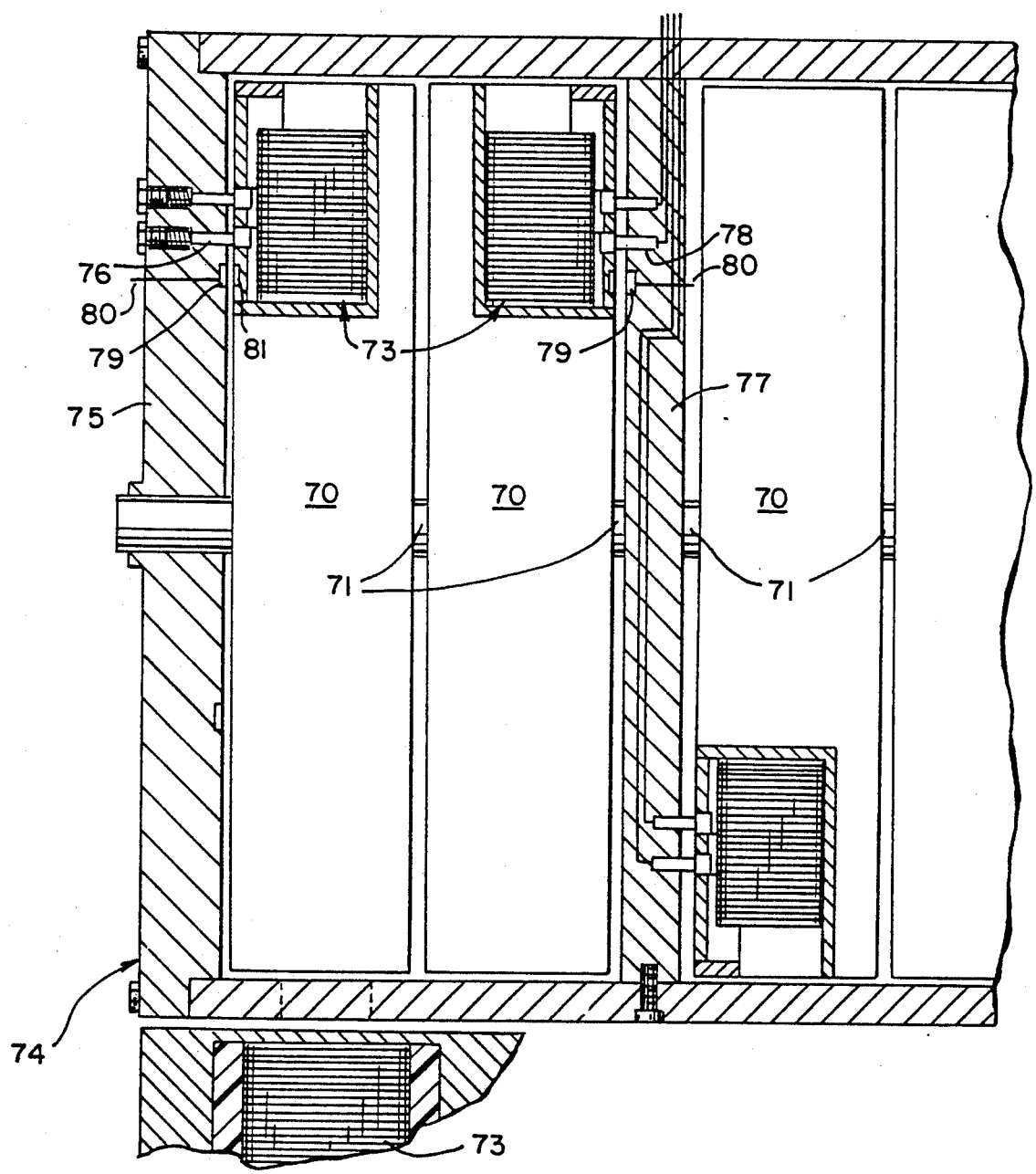
FIG. 5 is a partial side view of motor construction diagrammatically shown in FIG. 4.

For example, a plurality of individual rotor units 70 can be mounted on a common shaft 71, as diagrammatically shown in FIGS. 4 and 5 and operate within a mating stator 72 to form a single outer housing.

The annular stator 72 includes distributed electromagnetic units 73 (FIG. 5) enclosed within an outer stator housing 74, closed at the opposite ends in suitable end bearing plates 75.

Four separate rotors units 70 are shown mounted on common shaft 71 and spaced within the stator 72 and bearing plates 75. Brush units 76 in each end plate 75 provide for electrical power to the adjacent rotors. A central bearing plate 77 is mounted as a part of the stator unit 72 and includes brush units 78 which provide electrical connection to the two adjacent center rotors 70.

In the illustrated embodiment of FIGS. 4 and 5, the timing system is shown with a sensor 79 built into the outer end bearing plates 75 and the plate 77 and includes pick-up leads 80 connected to the sensors. The end face of the adjacent inner rotor 70 carries appropriate timing elements 81 to precisely locate the rotors with respect to the stator, and provide appropriate signals to a control unit, as previously described.

The motor units may of course be separate units such as shown in FIGS. 2 and 3, with a common shaft or individual shafts suitably coupled to each other. The number of motor sections can of course be varied with appropriate individual or shared contact plates between each pair to provide for appropriate coupling of power to the respective motor sections.

Further, with multiple motor units on a common shaft, alternate motor units may be constructed with opposite orientation of the electromagnetic units to selective establish opposite rotation of the motor shaft.

As previously discussed, with multiple sections or a substantial number of closely spaced pole units, the energization of successive coils can be established to effectively maintain a continuous rotating torque on the motor to provide an essentially constant and continuous rotation or any degree of steps. Further, with reversely oriented rotor sections in a composite motor structure, a reverse rotational torque can be created by reverse energization of selected rotors for further controlling the rotational speed and/or direction of the motor. Thus, reverse energization of selected units will tend to create a reverse torque such that the net forward torque is reduced. By varying the number or level of energization of the reverse torque, the net forward unit torque is varied. Thus, for example, each rotor section may be constructed as illustrated in FIGS. 3 and 4 with corresponding stator sections.

In accordance with the present invention, each rotor unit can of course be formed with the number of spaced electromagnetic units limited only by the space limitation then existing in any given diameter motor. Thus, with the crank-like rotor pole structure, there is required spacing of the rotor cores to accommodate the power coils. For example, a system using a rotor core unit 85 with sixteen spaced poles 86 is diagrammatically illustrated in FIG. 6, providing a more limited space for the coils, not shown. The greater number of poles permit construction with a lesser axial line while maintaining operation between an essentially continuous constant speed rotation to any degree of stepped positions of the rotor.

Figure 7:
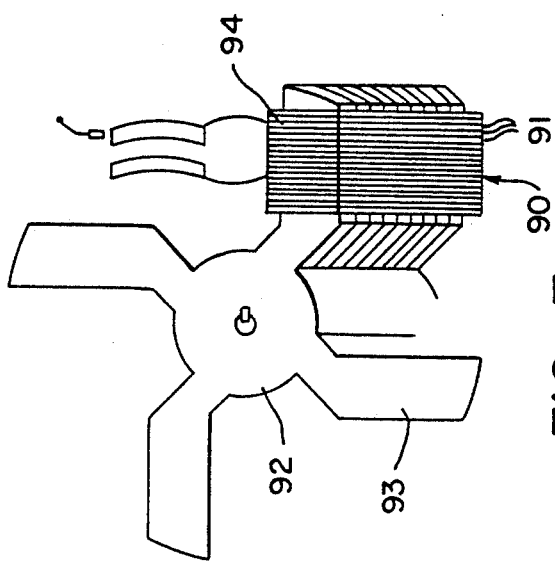
FIG. 7 is a pictorial view of a rotor constructed in accordance with the present invention and employing a rotor unit of a laminated construction.

Although shown as a relatively narrow motor unit with generally solid core structures, the magnetic cores and poles can also be readily adapted to and constructed as laminated cores. Such a structure may be particularly desirable where a rotor having a substantial axial length is desired. A laminated core structure 90 is diagrammatically illustrated in FIG. 7 for a rotor unit having a cross-section similar to that shown in the diagrammatic motor illustration of FIG. 1. In FIG. 7, the rotor structure 90 consists of a plurality of thin laminations 91 defining an axially extended core. Each lamination 91 is generally constructed with an inner circular hub 92 adapted to be keyed or otherwise secured to a shaft. L-shaped crank poles 93 are integrally formed with the hub 92 and project outwardly to produce a chordal magnetic core. The plurality of laminations 91 are interconnected to form a rotor stack of a desired axial depth. The winding or coil 94 is then wound around the extended magnetic pole and suitably connected to a power supply, not shown, to form the rotor structure.

Although FIG. 7 is referred to as describing an elongated rotor section obviously, a multiple section motor may include the individual rotors and/or stator sections formed as laminated magnetic core, such as generally shown in FIG. 7 for the rotor.

Figure 6:
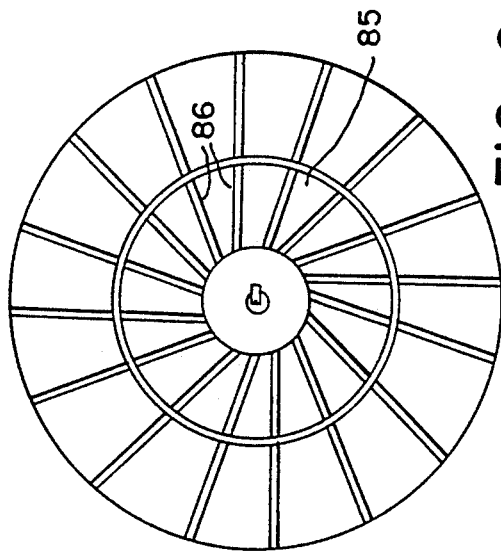
FIG. 6 is an end view diagrammatically showing a type of construction of a motor unit with an integral hub and a plurality of electromagnetic units in the stator and the rotor.
Figure 8:
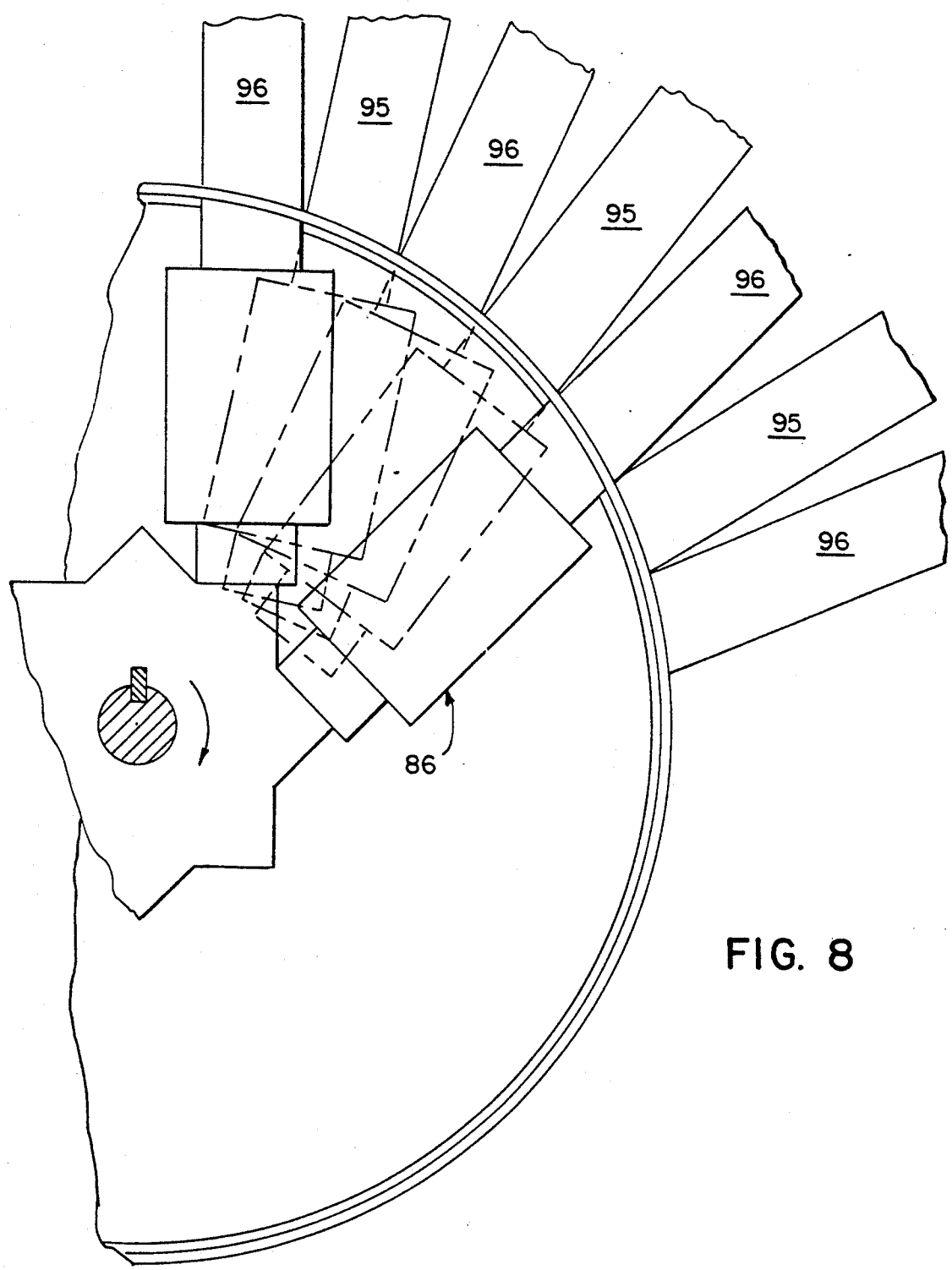

Further, as shown in FIG. 6, the stator poles may be spaced with a greater spacement than the rotor poles. This may provide available space for additional electromagnetic unit interposed therebetween. FIG. 8 illustrates the additional pole units 95 for alignment with the rotor pole as the rotor rotates into the spacement between the full-line illustration of the stator poles 96. Each rotor coil would thus be energized twice for each single energization of the successive stator coils. Multiple section rotors could then also be provided with the poles offset to provide improved overlapping energization for forward energization of the rotor.

Opposite energization of closely adjacent coils but offset electromagnetic units, attract the core unit and provide a corresponding driving force, further pulling the rotor core into alignment with the stator cores. This condition would, of course, be created until such time as the fields are switched to create the repelling and forward force in the previously energized attracting units to reinitiate the driving forces. Further, with one electromagnetic unit energized to attract the poles and another to provide forward driving force, the rotor may be moved to an intermediate position.

With a concentrated coil structure, the power windings may be inductively energized through a suitable transformer construction. In addition, one component of the motor units may include a permanent magnet with the second component including electromagnetic units. For example, a rotor unit may be provided with appropriate permanent magnets and the stator having electromagnetic units to produce the necessary repelling driving forces.

The present invention is readily constructed employing present day technology including the standard metal or other materials for forming of the core and support structures and the like, wire for the coils for both the stator unit and the rotor units as well as providing a proper electrical power supply and suitable controller for proper pulsed energization of the electromagnetic units.

With the forward and reverse rotor assemblies, the units can provide a smooth control in that the opposite rotating assemblies provides a means to provide for rapid slowing of the forward or reverse speed of the assembly.

The present invention thus provides a new motor structure which can provide both a stepping or continuous rotation. The stepping motor should provide extremely minute steps by the use of a plurality of axially mounted motor assemblies offset by any desired amount which in combination with each other will provide a highly sensitive and minute movement of the shaft.

Various modes of carrying out the present invention are contemplated as being within the scope of the following claims particularly pointing out and distinctly claiming the subject matter which is regarded as the invention.

I claim:

1. A direct current electric motor which is pulsed energized, comprising a rotor unit including an outer circular face and a supporting shaft member having an axis of rotation and with a plurality of circumferentially distributed magnetic rotor members, each of the said rotor members include a short radial connecting member projecting from said shaft member and the axis of rotation, an outer core pole member projecting outwardly at an angle from said connecting member, said pole member being coupled to said connecting member in a nonradial orientation and located on a chordal line within said circular face and with an outer end face within said circular face with respect to said shaft to create a crank drive construction, a magnetic unit associated with each of said rotor poles and selectively establishing a magnetic field with a predetermined outer pole and an opposite related inner pole, a stator unit coupled to said rotor and including a plurality of circumferentially distributed field magnetic units and each field magnetic unit including a stator pole oriented with respect to said rotor pole members for alignment with said rotor pole members, a magnetic unit associated with each of said stator poles and establishing a magnetic inner pole or the same polarity as the outer pole of said rotor poles, said stator poles having inner pole faces with a concave circular face of a radius substantially the same as said circular face of said rotor pole members and located to establish a small substantially constant air gap between said pole faces and at least one of said magnetic units including an electromagnetic units, and a control unit connected to said electromagnetic unit and operable to selectively establish direct current magnetization of the pole faces to have the same polarization with respect to the adjacent pole face of the aligned pole with the rotor poles and stator poles aligned, whereby said like polarization results in selective direct driving forces on said rotor as a result of said crank construction.

2. A direct current pulsed motor adapted to be energized from a suitable direct current electrical power supply, comprising a stator unit including a plurality of circumferentially distributed electromagnetic units, each of said stator electromagnetic units including a linear stator magnetic pole and a coil wound on said stator pole, said pole being located in said stator with the inner ends in a common circular cylindrical plane and extending outwardly on a chordal path line through said annular stator, a rotor rotatably mounted within said stator unit and including a plurality of circumferential distributed rotor electromagnetic units, each said rotor electromagnetic units constituting an even multiple of the stator electromagnetic units, each said rotor electromagnetic units including a magnetic linear pole having a cross-section substantially the same as said stator poles and interconnected to a rotor hub by an offset arm member defining a crank arm from said hub and constructed and arranged to align said rotor poles on a chordal path line in alignment with said stator poles and corresponding to the orientation of said stator poles said offset arm member being substantially shorter than said linear pole, the outer end of each of said rotor poles terminating in close space relation to the cylindrical plane of said stator unit, the outer end of each rotor pole having an arcuate end surface to maintain a constant air gap between the end surface of the poles the cylindrical plane, and magnetic field generating means coupled to said stator poles and said rotor poles and providing magnetic poles at the opposed and aligned ends thereof of a like polarity upon each alignment of said stator poles and said rotor poles whereby said poles develop opposing magnetic forces driving said rotor pole from said stator pole and thereby generating rotation of said rotor.

3. The direct current motor of claim 2, wherein said magnetic field generating means includes a coil on each of said rotor poles and a separate coil on each of said stator poles, a power supply, and a pulsing circuit connected to said rotor coils and to said stator coils, to selectively connect the power supply to said coils and a sensor unit for sensing the position of said rotor and operable to energize said coils in synchronism with alignment of a rotor pole and a stator pole whereby the opposing magnetic forces create said rotation of said rotor.

4. A direct current motor energizable from a direct current energy supply comprising a rotor having a central shaft and a rotor core secured to said shaft, a plurality of drive arm units secured to said hub, each of said arms extending chordally along a chordal path across said rotor and extending from said hub outwardly on said chordal path to an outer cylindrical rotor surface, an annular stator assembly mounted in fixed relation with a cylindrical inner surface spaced outwardly from said outer cylindrical surface of said rotor and defining a uniform air gap between the ends of the rotor arms and the cylindrical inner surface, said rotor having a plurality of rotor windings wound on each of said rotor poles, a fixed contact member secured to said rotor in fixed relation to said winding and having sliding end-faced contacts for individually supplying DC power to each of said rotor windings, an annular stator having a plurality of electromagnetic units circumferentially mounted therein and including poles aligned and oriented in accordance with the chordal orientation of said rotor poles and projecting outwardly from said cylindrical inner surface for precise axial alignment with said rotor poles, said stator poles having end faces substantially the same as said rotor poles and spaced for simultaneous alignment of a plurality of said poles stator windings would on each of said stator poles, switch means for connecting said stator winding to a DC power supply to establish a unidirectional magnetic field in each of said stator poles, a fixed contact plate mounted adjacent to said rotor and including sliding contacts adapted to slidingly engage said end-face contacts of said rotor windings, and switch means connected to said sliding contacts and to said DC power supply for selective energizing of said rotor windings in timed synchronism with said stator windings and the alignment of the stator and rotor poles so as to establish a counterforce between the fixed stator poles and the rotatable rotor poles to thereby generate rotation of said rotor, and controls connected to said switch means for selective energizing of the said stator windings and said rotor windings to control the output torque and speed of said motor.

5. The direct current motor of claim 4 including control means connected to control energization of said coils.

6. The motor of claim 4 wherein said control means includes a current control for varying the energy supplied to said coils and thereby the repelling forces to vary the rotational speed of said motor.

7. The motor of claim 4 wherein said control means is operable to reverse the polarization of the coil and thereby the associated pole.

8. The motor of claim 1, including a plurality of motor sections each including a plurality of electromagnetic stator units and a plurality of electromagnetic rotor units, said motor sections being divided into first motor sections and second motor sections, said first motor sections having said magnetic pole oriented to provide rotation in a first direction and said electromagnetic units of said second motor sections being oriented and constructed to establish rotation in an opposite direction.

9. The direct current motor of claim 1, having means coupled to said rotor unit to monitor the position of said rotor unit and establish an output in synchronism with predetermined alignment of a rotor pole and a stator pole.

10. The motor of claim 9, including means to vary the polarity of at least one of said electromagnetic units to develop an attractive force between the magnetic poles.

11. The motor of claim 1, wherein said poles are formed as laminated poles.

12. The motor of claim 1, wherein said rotor includes an inner hub integral with said magnetic poles.

13. The motor of claim 1, wherein said rotor poles and arm members are integral with a common hub to form a rotor core.

14. The motor of claim 12, wherein said hub includes a plurality of like lamination.

15. The direct current motor of claim 1, having a rotor with a central hub having a plurality of circumferentially space chordal walls, a plurality of electromagnetic poles coupled to said chordal walls and extending along, the chordal line of said rotor.

16. The motor of claim 1 including at least four rotor sections, said stator unit having end plates and a central plate, with every other section being constructed to establish a forward rotation and with adjacent sections being wound and located to establish opposite rotation of the motor shaft, said end plates and said central plate having an electrical power connectors coupled to the adjacent rotor sections.

* * * * *

UNITED STATES PATENT AND TRADEMARK OFFICE
CERTIFICATE OF CORRECTION

PATENT NO. : 5,233,251

DATED : August 3, 1993

INVENTOR(S) : CONRAD C. NEHMER

It is certified that error appears in the above-identified patent and that said Letters Patent is hereby corrected as shown below:

Claim 15, column 15, line 2, after "along" delete "," (comma).

Signed and Sealed this

Nineteenth Day of April, 1994

BRUCE LEHMAN

*Attest:*

*Attesting Officer*  *Commissioner of Patents and Trademarks*